United States Patent [19]

Espenan

[11] Patent Number: 5,006,229

[45] Date of Patent: Apr. 9, 1991

[54] METHOD OF MANUFACTURING A UNIT ASSEMBLY OF FILTER MEMBRANES, A MOLD USED IN THE METHOD, AND A PRODUCT OBTAINED FROM THE METHOD

[75] Inventor: Jean-Michel Espenan, Toulouse, France

[73] Assignee: Lyonnaise des Eaux, Paris, France

[21] Appl. No.: 448,527

[22] Filed: Dec. 11, 1989

[30] Foreign Application Priority Data

Dec. 23, 1988 [FR] France ................. 88 17075

[51] Int. Cl.$^5$ ............................................. B01D 67/00
[52] U.S. Cl. ................. 210/321.89; 210/496; 210/500.27; 264/46.6
[58] Field of Search .......... 210/496, 510.1, 500.21, 210/321.89, 34.8; 264/46.6

[56] References Cited

U.S. PATENT DOCUMENTS 3,381,999  5/1968  Steere, Jr. ............... 264/46.6 X
4,032,454  6/1977  Hoover et al. ............ 210/496 X Primary Examiner—Frank Spear
Attorney, Agent, or Firm—Amster, Rothstein & Ebenstein

[57] ABSTRACT

A method of manufacturing a unit assembly of filter membranes obtained by precipitating a polymer solution, comprises the following steps: a plurality of elongate porous elements are placed in an outer shell having a closed end and an open end, the elongate elements passing through said closed end and having longitudinal axes which are parallel to one another and to the direction extending between the two ends; injecting the polymer solution around the porous elements; injecting a fluid into one end of the elements, the fluid diffusing through the elements towards the polymer; and removing the polymer solvent which diffuses in the opposite direction from the other ends of the elements, thereby causing the polymer to precipitate and form a porous polymer structure around the porous elements and between them, with the porous structure having in contact with the porous elements a skin of adjustable porosity then removing the porous elements in order to unmold a porous polymer block pierced by channels whose longitudinal axes are parallel to one another. The invention also provides the resulting unit filter assembly, and mold for use in manufacturing it.

10 Claims, 1 Drawing Sheet

METHOD OF MANUFACTURING A UNIT ASSEMBLY OF FILTER MEMBRANES, A MOLD USED IN THE METHOD, AND A PRODUCT OBTAINED FROM THE METHOD

The invention relates to a method of manufacturing a unit assembly of filter membranes by molding, to the mold used for performing the method, and to the resulting product.

BACKGROUND OF THE INVENTION

Conventional filter membranes (for ultrafiltration, microfiltration, . . . ) are tubular membranes having porous walls, with an inside or an outside skin or with two skins (where the term "skin" designates a thin surface coating which is less porous than the remainder of the wall). These membranes are obtained by extruding a polymer solution in the form of a hollow fiber, and by precipitating the polymer (e.g. polysulfone). The resulting continuous hollow fiber is wound into a skein which may optionally be placed in a perforated sleeve, and the ends of the skein are potted in plates of resin used for mounting in a housing, with the end portions of the skein then being cut off in order to transform the remainder into a bundle of fibers which are open at both ends. The assembly is then mounted in a housing having inlet and outlet orifices in order to constitute a filter module.

The manufacture of such modules is thus lengthly and requires a plurality of steps including, inter alia, handling the fiber as it is formed, thereby running the risk of breaking it.

SUMMARY OF THE INVENTION

In order to remedy these drawbacks, the invention provides a method of manufacturing a unit assembly of filter membranes obtained by precipitating a polymer solution, wherein the method comprises the following steps:

placing a plurality of elongate porous elements in an outer shell having a closed end and an open end, the elongate elements passing through said closed end and having longitudinal axes which are parallel to one another and to the direction extending between the two ends;

injecting the polymer solution around the porous elements;

injecting a fluid into one end of the elements, the fluid diffusing through the elements towards the polymer; and removing the polymer solvent which diffuses in the opposite direction from the other ends of the elements, thereby causing the polymer to precipitate and form a porous polymer structure around the porous elements and between them, with the porous structure having in contact with the porous elements a skin of adjustable porosity;

then removing the porous elements in order to unmold a porous polymer block pierced by channels.

Both the solvent and the, or each, fluid used depend on the type of product desired. The fluid is generally a nonsolvent liquid which replaces the solvent and precipitates the polymer, or alternatively it may be a scavenging gas which causes the solvent to evaporate, thereby progressively increasing the concentration of polymer, and thus causing it to precipitate. Two fluids having different states may be used, e.g. in succession, in order to give rise to a particular polymer.

The invention also provides suitable molds comprising an outer shell having one end which is closed by a perforated plate and having its other end which is open, shell receives a plurality of elongate porous elements whose longitudinal axes lie parallel to each other and which project at one end beyond the closed end of the shell after passing through the perforations in the plate, and which are optionally interconnected at the other end to form a lid for closing the shell.

A unit filter assembly is also provided constituted by a molded porous polymer block pierced by integrally molded channels whose longitudinal axes lie parallel with one another, with the inside surfaces of the channels being capable of having a determined porosity which is less than that of the polymer block.

The elongate porous elements are tubes or solid rods of arbitrary section, e.g. circular or hexagonal, thereby obtaining channels having the corresponding section.

The initial polymer solution may contain additives for controlling pore formation by acting on the dissolving power of the solvent relative to the polymer, by occupying a certain amount of volume, by improving the uniformness of the solution, etc., depending on the type of polymer. The precipitation rate can be varied by adjusting the flow rate at which the fluid is injected, for example, thereby obtaining the desired porosities. If the solvent is a heavy solvent, then water will generally be used, whereas if the solvent is volatile, then scavenging by means of a gas, and advantageously by means of air, will suffice to cause it to evaporate and thereby form a solid polymer.

By using different precipitation conditions, e.g. using fluids of different, more or less precipitating natures, it is possible to provide channels of different porosities in the same block.

The porosity of the elements is selected so that the viscous polymer solution does not penetrate into their walls. However, the walls do pass the small molecules of the injected fluid, as well as the solvent and the additives, if any.

It is also possible to use tapering porous elements, thereby both facilitating unmolding and facilitating removal of the filter cake by backwashing the porous block while it is in use for filter purposes, and this is in contrast to using conventional extrusion techniques which are incapable of obtaining tapering channels.

In addition, since the polymer solution is inserted into a mold and is not extruded, there is no longer any need to satisfy narrow constraints on precipitation rate to be obtained in order to fix the membrane in the shape imparted to it by extrusion, and it is therefore possible to select precipitation parameters for obtaining the porosity desired for the final solid polymer structure.

The molding method also makes it possible to use a solution having a very low concentration of the basic polymer since the mechanical strength of the resulting block is provided by increasing the thickness between the channels.

BRIEF DESCRIPTION OF THE DRAWING

An implementation of the invention is described by way of example with reference to the accompanying drawing, in which.

DETAILED DESCRIPTION

Figure 1:
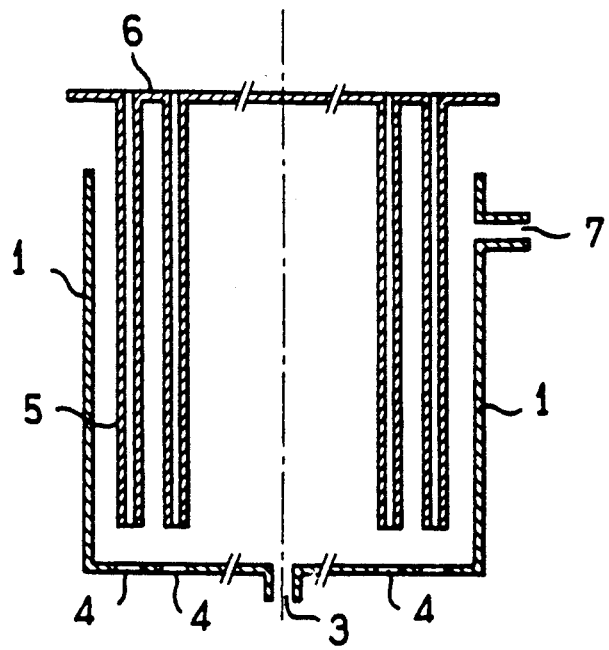
FIG. 1 is a diagrammatic section through a mold for implementing the method, prior to the mold being assembled.
Figure 2:
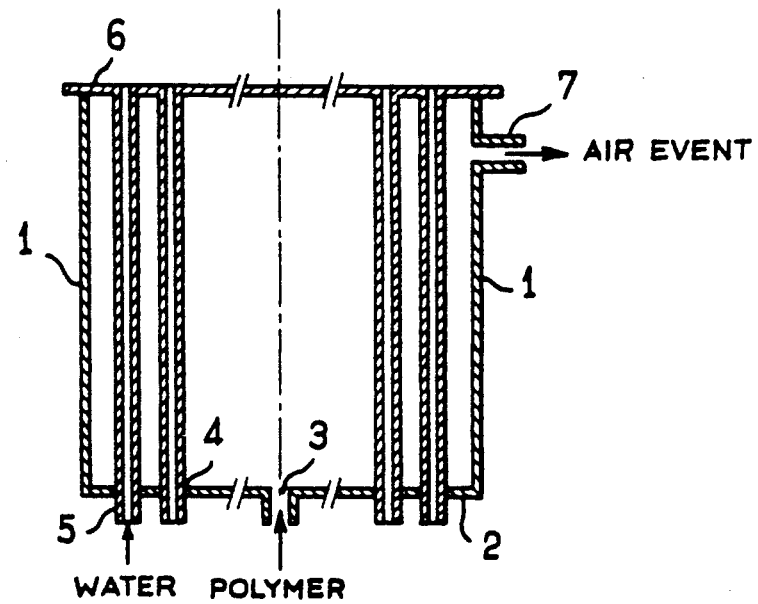
FIG. 2 shows the same mold after it has been assembled.

The mold used in the method is constituted by an outer shell 1 which is fluid-tight or porous, and may be of arbitrary section, circular, square, rectangular, etc. The bottom of the shell comprises a bottom 2 pierced by an inlet orifice 3 and by numerous orifices 4 which receive the porous tubes 5 (constituting examples of the elongate elements) whose longitudinal axes lie parallel with one another. In the top portion, the porous tubes 5 are interconnected by a lid 6 which closes the outer shell 1. However, a lid is not absolutely essential and a grating holding the elements in place would suffice, for example.

A lateral orifice 7 is provided through the shell 1 in order to evacuate air when the polymer solution is injected into the mold when it has been closed by a lid.

After the mold has been assembled by inserting the tubes 5 in the orifices 4 and closing the top of the mold by means of the lid 6. the polymer solution is injected into the mold via the inlet orifice 3, with air being evacuated via the orifice 7.

When the mold is full, the selected fluid (water or appropriate liquid if the polymer solvent is heavy air or an inert gas if the solvent is volatile) is caused to flow inside the tubes 5 and optionally around the shell if the shell is porous. The flow of fluid may be obtained by injection or by suction, with the fluid preferably entering via the ends of the tubes which project beneath the bottom of the mold.

As mentioned above, the porosity of these tubes is selected so that the polymer solution does not penetrate into the walls of the tubes. When the fluid, e.g. water, is caused to flow, a portion of the fluid passes through the walls of the tubes, while the solvent and the additives contained in the polymer solution pass through the walls of the tubes in the opposite direction and are removed from the tubes together with the flow of water. The polymer is thus caused to precipitate progressively inside the mold together with optional formation of a skin around the tubes.

Figure 3:
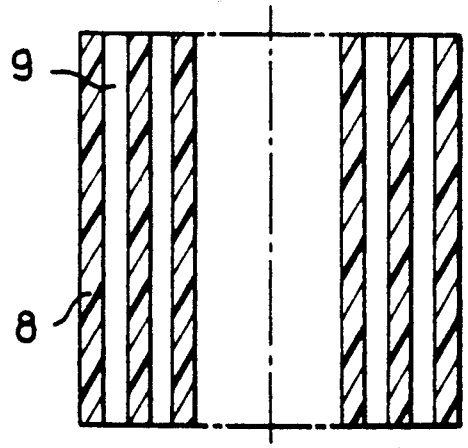
FIG. 3 is a section through a porous polymer block pierced by channels and in accordance with the invention.

Once precipitation has been completed, the mold is disassembled, thereby providing a porous block 8 pierced by channels 9 whose longitudinal axes are parallel with one another (FIG. 3).

Depending on the shape of the outer shell, the resulting porous block may be circular, square, rectangular, etc. in section. If it is rectangular in section, it is possible to obtain a thin sheet. In addition, it is possible to make the outer shell in such a manner that the resulting sheet includes studs or bumps on either one or both surfaces, thereby enabling these sheets to be used in a stack like a filter-press, but without requiring additional spacers.

The distribution of the elongate elements within the shell, and thus the distribution of the channels within the porous block can thus be selected at will, and the spacing between the elongate elements is determined as a function of the concentration of the polymer in the solution so as to obtain the required mechanical strength. The shell 1 and the elements 5 are made of a substance which is inert relative to the solvent and which does not adhere to the membrane formed in order to make unmolding possible. The shell may be of metal, glass, plastic, etc. The porous tubes may be made of sintered metal, sintered glass, ceramics, carbon, . . . , and they may even be constituted by tubular membranes obtained by extruding Teflon, polypropylene, polyethylene, . . . .

When the porous elements are constituted by flexible elements in order to avoid having to thread them one-by-one through the perforations in the bottom of the mold, it is possible to stiffen them either by means of porous dressings, or else by inserting fine threaded rods in order to avoid head-loss and ensure a regular flow of the precipitation liquid.

Naturally the method of the invention is applicable to any polymer suitable for preparing a filter membrane.

By using tapering porous elements (not shown) it is possible to obtain tapering channels which facilitate uncaking during the backwashings to which the porous block is subjected while it is in use as a filter.

In addition, by inserting solid elements (rods) in planes perpendicular to the axes of the channels, it is possible to establish drain passages for the filtered substance extending perpendicularly to the axes of the channels, and this cannot be done using the conventional extrusion method.

The unit filter assembly obtained by implementing the present invention is then mounted in a housing in order to constitute a filter module. Alternatively, the housing may be omitted by coating the outside of the porous block with a sealing coating, e.g. using a thermosetting resin, and leaving a passage for the permeate.

I claim:

1. A method of manufacturing a unit assembly of filter membranes obtained by precipitating a polymer solution, the method comprising the following steps:

placing a plurality of elongate porous elements in an outer shell having a closed end and an open end, the elongate elements passing through said closed end and having longitudinal axes which are parallel to one another and to the direction extending between the two ends;

injecting the polymer solution around the porous elements;

injecting a fluid into one end of the elements, the fluid diffusing through the elements towards the polymer; and removing the polymer solvent which diffuses in the opposite direction from the other ends of the elements, thereby causing the polymer to precipitate and form a porous polymer structure around the porous elements and between them, with the porous structure having in contact with the porous elements a skin of adjustable porosity;

then removing the porous elements in order to unmold a porous polymer block pierced by channels whose longitudinal axes are parallel to one another.

2. A method according to claim 1, wherein the fluid is a liquid.

3. A method according to claim 1, wherein the fluid is a gas.

4. A method according to claim 1, wherein two fluids having different states are used.

5. A method according to claim 1, wherein different fluids are used in different ones of the porous elements.

6. A unit filter assembly, constituted by a molded porous polymer block pierced by channels whose longitudinal axes are parallel to one another and whose inner surfaces created during the precipitation of the polymer constitute filter membranes.

7. A unit assembly according to claim 6, wherein the porosity of the inside surfaces of the channels is less than that of the polymer block.

8. A unit assembly according to claim 6, containing channels of different porosities.

9. A unit assembly according to claim 6, wherein the channels are tapering.

10. A mold for manufacturing unit filter assemblies by implementing the method of claim 1, the mold comprising: an outer shell having a closed end and an open end; a plurality of elongate porous elements being placed inside the shell and allowing within and through them the passage of a fluid, the elongate elements having longitudinal axes which are parallel to one another and to the direction between the two ends of the shell; and one end of each elongate element extending beyond the closed end of the shell and passing through perforations provided in said closed end so as to allow the outlet of said fluid out of the mold.

* * * * *